United States Patent [19]

DePouilly et al.

[11] 4,242,754
[45] Dec. 30, 1980

[54] CLOCK RECOVERY SYSTEM FOR DATA RECEIVER

[75] Inventors: Bernard M. H. DePouilly, Paris; Edouard M. J. A. I. Issenmann, Versailles, both of France

[73] Assignee: Le Material Telephonique, Boulogne-Billacourt, France

[21] Appl. No.: 963,326

[22] Filed: Nov. 24, 1978

[30] Foreign Application Priority Data

Nov. 30, 1977 [FR] France ............... 77 36062

[51] Int. Cl.³ ............................................. H04L 7/02
[52] U.S. Cl. ..................................... 375/110; 328/63
[58] Field of Search ............... 178/69.1; 179/15 BA, 179/15 BS; 307/208, 269; 328/63, 72, 155; 375/99, 106, 108, 110, 111, 117; 370/100

[56] References Cited

U.S. PATENT DOCUMENTS

| 3,851,251 | 11/1974 | Wigner et al. | 179/15 BA |
| 3,936,603 | 2/1976 | Guppy et al. | 178/69.1 |
| 4,004,090 | 1/1977 | Goto et al. | 178/69.1 |
| 4,021,609 | 5/1977 | Oyama et al. | 178/69.1 |

*Primary Examiner*—Benedict V. Safourek
*Attorney, Agent, or Firm*—Roland Plottel

[57] ABSTRACT

The invention relates to a clock recovery system for a data receiver. The system includes a ring counter connected to a flip-flop and a circuit for triggering the ring counter controlled by the first pulse of the transmitted signal.

3 Claims, 2 Drawing Figures

CLOCK RECOVERY SYSTEM FOR DATA RECEIVER

BACKGROUND OF THE INVENTION (a) Field of the Invention

The present invention relates to data transmission systems and more particularly to a system for recovering the clock for a data transmission receiver.

(b) Description of the Prior Art

A typical data transmission system consists of a transmitter which transmits data, in the form of binary pulse trains, to a receiver over a serial transmission link. Both the transmitter and receiver are provided with a local clock and typically the durations of the pulses transmitted are much greater than the period of the local clock. The local clocks are required to have exactly the same frequency and are controlled, for example, by a crystal oscillator.

The clock recovery circuit according to the invention allows the receiver to acquire the signal present on the data transmission link at the correct instant of time. The clock signal can be transmitted from the transmitter in either of two ways:

(a) over a transmission channel materially different from that used for the data signal; or
(b) over the same channel as the data signal.

In the first case, the transmission link will be limited in distance and in frequency because of the phase difference that exists in two signals which are transmitted over different channels. In the second case, which corresponds to the present invention, there already exist systems performing this same function. However, the system described herein has the advantage of synchronizing from the very first data signal pulse, thereby eliminating the presynchronization period normally required in prior art systems.

SUMMARY OF THE INVENTION

According to one aspect of the invention, the clock recovery system includes a ring counter having two outputs which are connected to the inputs of a first JK flip-flop, the output of which produces the recovered clock and a circuit for triggering the ring counter controlled by the data signal. This arrangement has the advantage of not requiring transmission of another data signal to acquire synchronization and requires only one simple logic circuit at the receive end.

In accordance with another aspect of the invention, the novel trigger circuit employed eliminates interference.

According to another aspect of the invention, a system is provided for eliminating synchronization errors due to asynchronism of the incident signal with the local clock signal.

The invention and its mode of operation will be more fully understood when the following description of a practical example using TTL technology is read with the appended drawings in which:

DETAILED DESCRIPTION OF THE INVENTION

Figure 1:
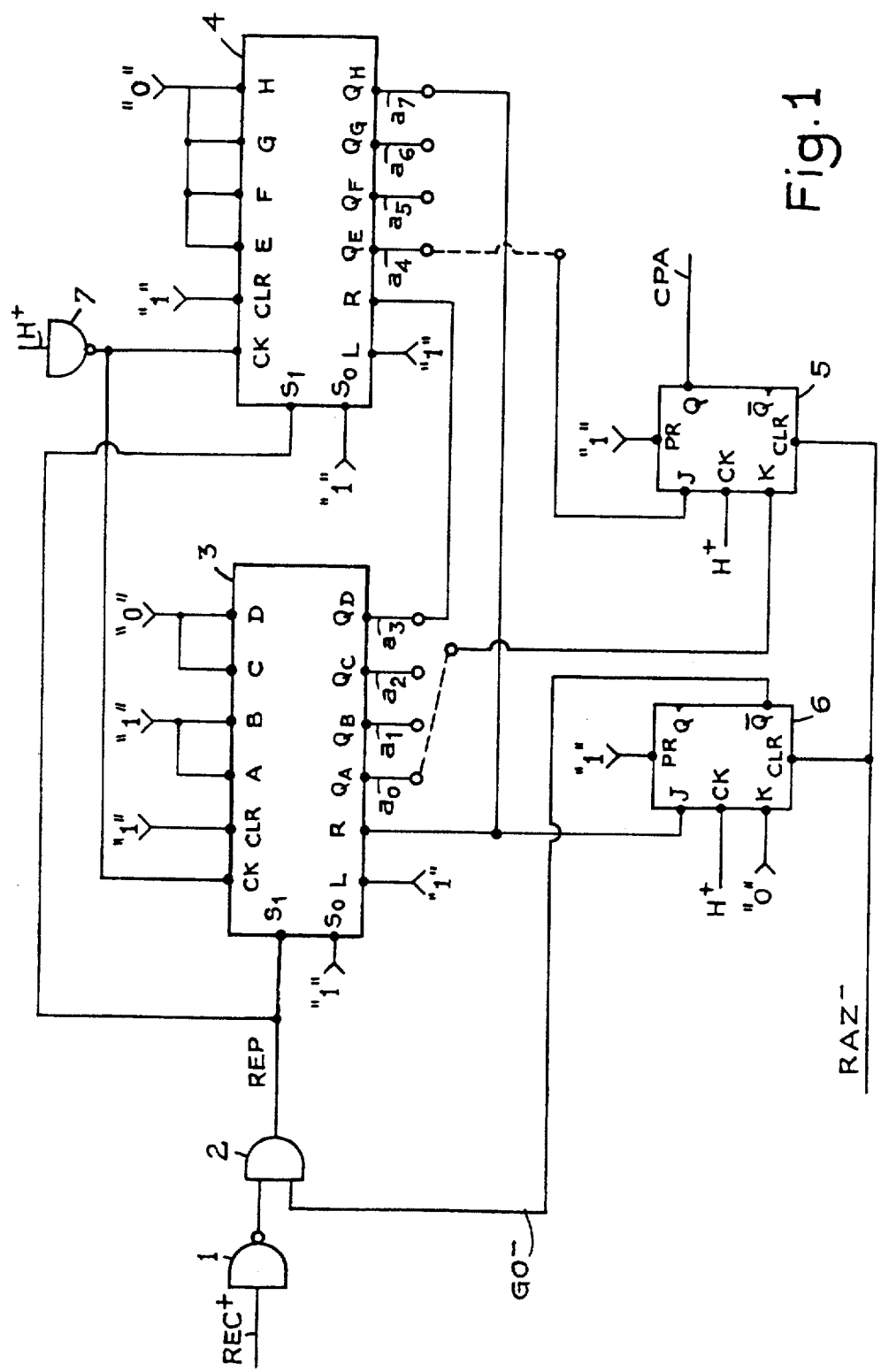
FIG. 1 is a circuit diagram of clock recovery in accordance with the invention.

The system according to the invention is shown in FIG. 1.

The circuit includes a gate 1 which inverts the incoming data signal REC+ and whose output is connected to one input of an AND gate 2. The other input of AND gate 2 is connected to output $\bar{Q}$ of a first J-K flip-flop 6, and its output is connected to input $S_I$ of a first shift register 3. The signal obtained on the output of gate 2 is designated REP.

Logical "1's", i.e., 5 V, are permanently applied to inputs $S_O$, CLR, L, A and B or register 3. Input CK of this same register is fed with the local clock signal H+ inverted by a gate 7. Inputs C and D are grounded, i.e., are logical "0's". Input R of register 3 is connected to output $Q_H$ of a second shift register 4. Output $Q_A$ is connected to input K of a second J-K flip-flop 5, whilst output $Q_D$ is connected to input R of register 4. Registers 3 and 4 may comprise any suitable TTL shift register, for example the 74S194 4-Bit Bidirectional Universal Shift Register manufactured by Texas Instruments. J-K flip-flops 5 and 6 may comprise any suitable TTL dual J-K flip-flops with pre-set, common clear and common clock, for example the 74LS78 J-K flip-flop manufactured by Texas Instruments.

Logical "1's" are permanently fed to inputs $S_O$, CLR and L or register 4. Inputs E, F, G and H are fed with logical "0's", whilst input $S_I$ is fed with signal REP. Input CK of shift register 4 is also fed with the clock signal H+ inverted by gate 7. Output $Q_E$ is connected to input J of flip-flop 5, whilst output $Q_H$ is connected to input J of flip-flop 6.

Inputs PR of flip-flops 5 and 6 are fed with logical "1's", whilst inputs CK of these same flip-flops are fed with the local clock signal H+. Input K of flip-flop 6 is grounded. The recovered clock signal CPA, the subject of the present invention, is obtained from the output Q of flip-flop 5.

Inputs CLR of flip-flops 5 and 6 are fed with a local resetting signal RAZ- which is sent at the end of each transmitted pulse train in order to reset the circuit to its initial state.

Figure 2:
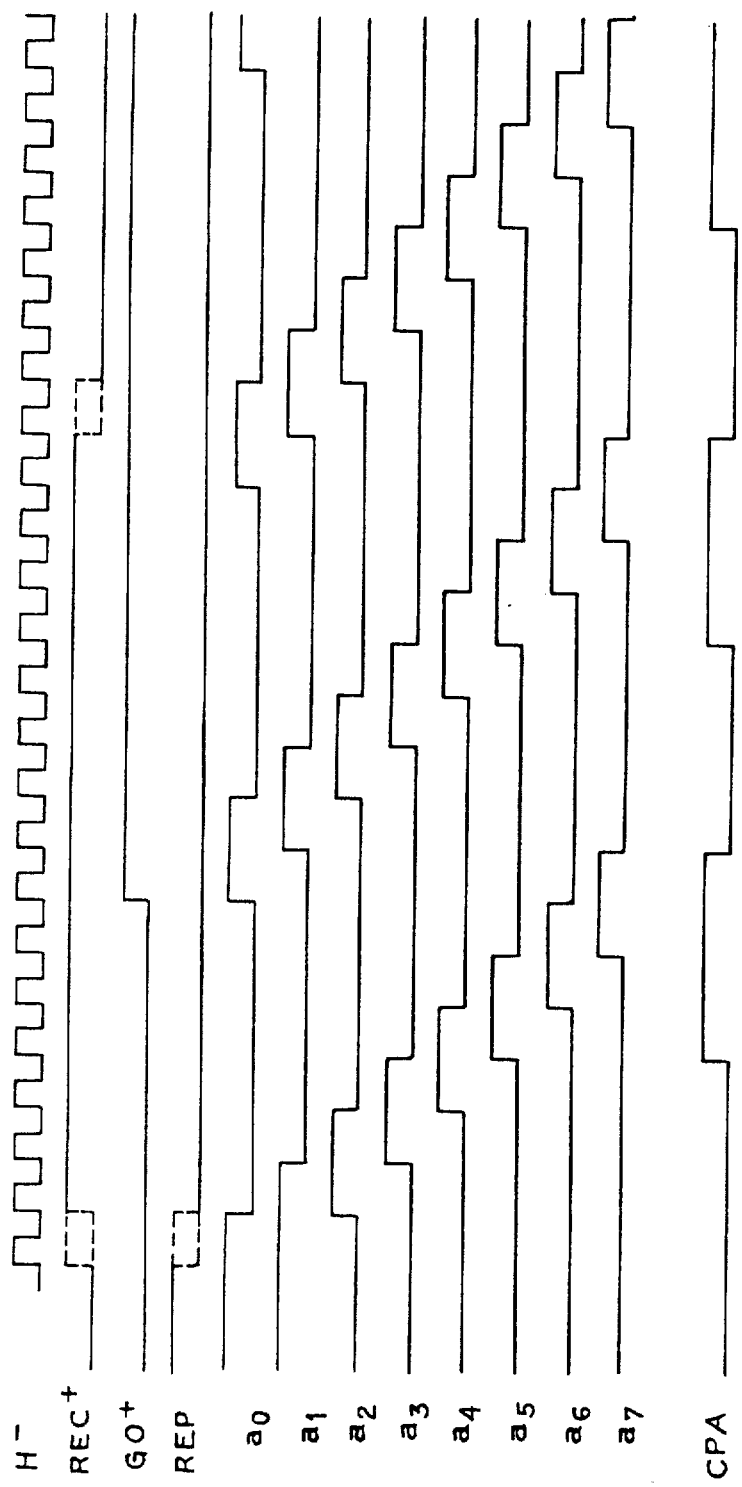
FIG. 2 is a timing diagram for the circuit shown in FIG. 1.

The operation of the system illustrated in FIG. 1 is explained by means of FIG. 2.

FIG. 2 illustrates the triggering of the circuit at the instant the first data signal pulse is received, this pulse being designated by REC. In FIG. 2, H− is shown, i.e., the inverse of the local clock H+, since the shift registers described operate on the rising edge of the clock signal applied to the CK input of Registers 3 and 4, in this case H−, whilst the JK flip-flops described trigger on the falling edge of the clock signal applied to the CK input of J-K flip-flops 5 and 6, in this case H+. These connections enable the registers and flip-flops to be operated on the same rising edge of H−.

In the absence of any signal on the data transmission link, REC+ is "0", as is signal GO+ obtained at the output Q of flip-flop 6. Signal REP obtained at the output gate 2 and signal RAZ− are logical "1's".

The inputs of AND gate 2 are fed with signals REC− and GO−, such that REP is a logical "1" in the rest state, and on each rising edge of H− shift register 3 reproduces on $Q_A$, $Q_B$, $Q_C$, $Q_D$, $Q_E$, $Q_F$, $Q_G$ and $Q_H$ the signals present on inputs A, B, C, D, E, F, G and H respectively.

The signals obtained on $Q_A$, $Q_B$, $Q_C$, $Q_D$, $Q_E$, $Q_F$, $Q_G$ and $Q_H$ are designated $a_0$, $a_1$, $a_2$, $a_3$, $a_4$, $a_5$, $a_6$ and $a_7$ respectively.

When the first pulse of the signal appears on the data transmission link, REC+ changes to "1", at any instant during a local clock period. For this reason, this transition is indicated by dashed lines in FIG. 2. Since REC+ is a logical "1" and the other signals have not changed, REP on $S_I$ of register 3 changes to "0", initiating the shift.

Shift registers 3 and 4 are connected in a manner constituting a ring counter, i.e., $Q_D$ is connected to R of register 4 and $Q_H$ is connected to R of register 3, thereby producing the wave-forms for signals $a_0$ to $a_7$ in FIG. 2.

At the sixth rising edge of H− following the first pulse of REC, $a_7$ changes to "1". A logical "1" is therefore obtained on R of register 4, causing $a_0$ to change back to "1" on the seventh rising edge of H−, and a logical "1" is obtained on J of flip-flop 6, causing GO+ to change to "1". GO+ remains a "1" as long as there is no reset signal, with the result that from this seventh rising edge of H−, signal REC may have either value and the shift operation continues since the fact that GO− is a "0" results in REP also being a "0".

AND Gate 2 and flip-flop 6 constitute the ring counter triggering circuit.

Signal CPA is recovered on output Q of flip-flop 5. It is generated by flip-flop 5, which is triggered by the signals obtained from the ring counter comprising registers 3 and 4. In the example described, input J of flip-flop 5 is fed with signal $a_4$ and input K with signal $a_0$. The falling and rising edges of CPA can be adjusted separately in position by connecting inputs J and K of flip-flop 5 to two outputs of the ring counter registers by two links, which may be advantageous for compensating for the delay times of logic circuits following CPA. By increasing the number of shift registers in the ring counter, signal CPA can be positioned anywhere with respect to signal REC.

The uncertainty regarding the position of CPA with respect to REC decreases as the frequency of the local clock H increases, since this uncertainty is equal to one period of H (dashed lines for REC in FIG. 2). The position accuracy also depends on the accuracy of the frequency of H, which is also equal to that of the local clock of the data transmitter generating REC, since a drift in H results in a drift in CPA with respect to REC, thereby limiting the length of transmitted pulse train.

Moreover, the synchronization uncertainty phenomenon is related to the fact that the register shift triggering signal REP can have any position with respect to clock H− applied to these registers. In particular, if signal REP is too close to the active edge of the clock, the register may behave abnormally, combining load and shift operations in an aberrant manner. The simple solution, which consists in applying logical "1's" to inputs A and B, removes any uncertainty since $a_1$ is a "1" after the first active edge of the local clock following the triggering signal, whether this be a shift operations or load operation edge; whence the advantage of using a ring counter.

In addition to removing synchronization uncertainty, this system has the advantage of eliminating interference, since any pulse having a duration of less than six times the local clock period cannot trigger flip-flop 6, and the ring counter returns to its initial state. It is possible to increase this maximum duration of eliminated interference by adding one or more registers to the ring counter and by connecting J of flip-flop 6 to one of the outputs of these registers.

Signal CPA is thus triggered by the occurrence of the first signal pulse and can be stopped only by a resetting pulse of signal RAZ−, preparing the system to receive a further pulse train by resetting the circuit to its initial state.

Signal RAZ− can be generated, for example, by means of a shift register which counts the pulses transmitted over the link for each pulse train and which sends a resetting pulse after the last data signal pulse.

Although the principles of the present invention are described above in relation to a specific practical example, it should be clearly understood that the said description is given as an example only and does not limit the scope of the invention.

We claim:

1. A clock recovery system for a data receiver fed over a data transmission link with data in the form of binary pulse trains transmitted at a fixed clock frequency, said system comprising:
   a ring counter triggering circuit which has the first of its two inputs connected to the data transmission link thereby to receive the binary pulse trains transmitted over said data transmission link;
   a ring counter which has an input connected to the output of the ring counter triggering circuit to receive said binary pulse trains and which has one selected output connected to the second input of the ring counter triggering circuit, this output being selected in function of the length of the longest pulse to be considered as interference;
   a JK flip-flop which has its inputs J and K connected to two chosen outputs of the ring counter and the output of which produces the recovered clock signal, the outputs being chosen in function of the position of the rising edges and the length of the pulses desired for the recovered clock.

2. A clock recovery system in accordance with claim 1, wherein said triggering circuit comprises:
   a second JK flip-flop having its J input connected to the selected output of its K input to logic "0";
   an AND gate havng one of its two inputs connected to the data transmission link through an inverter, its other input connected to $\overline{Q}$ output of the second JK flip-flop and its output connected to a mode control input of the ring counter.

3. A clock recovery system in accordance with claim 1, wherein said connections between said ring counter and said first JK flip-flop are provided by a selectively connectible link.

* * * * *